2,937,925
SOLVENT EXTRACTION PROCESS FOR URANIUM FROM CHLORIDE SOLUTIONS

Charles A. Blake, Jr., and Keith B. Brown, Oak Ridge, and Donald E. Horner, Clinton, Tenn., assignors to the United States of America as represented by the United States Atomic Energy Commission No Drawing. Filed Nov. 23, 1956, Ser. No. 624,178

2 Claims. (Cl. 23—14.5)

Our invention relates to liquid-liquid extraction methods of recovering uranium values from uranium-bearing aqueous solutions and more particularly to an improved liquid-liquid extraction process wherein a trialkyl phosphine oxide is used as the organic extractment.

It has been discovered that the organic phosphorus compounds represented by the formula

where R represents an aryl group, an alkyl group or an aryl-substituted alkyl group are excellent extractants for uranium values from an acidic solution, substantially quantitatively extracting uranium values present in such a solution. A description of the use of these compounds as uranium extractants may be found in co-pending application Serial No. 624,179, Uranium Extraction Process, Willis H. Baldwin and Cecil E. Higgins, filed November 23, 1956, and now Patent No. 2,864,668, issued December 16, 1958.

Although the prior art teaches the use of these compounds as uranium extractants from nitric acid, hydrochloric acid and sulfuric acid solutions, there was no method known for removing the uranium from the uranium-loaded, organic phase which was suitable for large scale processes and there was no known process for using these compounds to extract uranium from a solution having a phosphate concentration greater than 0.5 molar, or from a solution having a sulfate concentration greater than 0.5 molar at a pH of 1 or higher. Uranium forms a stronger complex with these compounds than with prior art extractants. Furthermore, although uranium values could be removed from other neutral organic uranium extractants such as trialkyl phosphates, ethers and ketones by contacting the uranium-loaded organic phase with water, an organic solution containing a uranium-phosphine oxide complex is substantially unchanged by contacting it with water.

For some applications, it has been necessary to find a method for extracting uranium values from solutions containing phosphate or sulfate ions because some solutions, such as many ore leach liquors, contain substantial quantities of phosphate and sulfate ions. Also, for large scale applications it has been necessary to find a method for efficiently recovering the extracted uranium values from the organic phase.

One object of our invention is to provide an improved process for the recovery of uranium values from an acidic aqueous solution containing uranium values when using trialkyl phosphine oxides as extractants.

Another object of our invention is to provide a process for the recovery of uranium values from an acidic aqueous solution containing substantial quantities of phosphate or sulfate ions.

Another object of our invention is to provide an improved method for stripping uranium values from an organic solution containing trialkyl phosphine oxide.

Still another object of our invention is to provide a stripping step for removing uranium values from an organic solution containing trialkyl phosphine oxide which is suitable for use in large scale processes.

In accordance with our invention an improved process is provided for the recovery of uranium values when using a trialkyl phosphine oxide as an organic extractant and extracted uranium values may be removed from the uranium-loaded organic phase by contacting said organic phase with an aqueous complex-breaking stripping solution.

By the use of our improvements uranium values may be extracted with trialkyl phosphine oxides from acidic aqueous solutions which contain substantial quantities of sulfate or phosphate ions along with uranium values, and extracted uranium values may be efficiently removed from organic solutions containing uranium-trialkyl phosphine oxide complexes. Examples of suitable phosphine oxides which may be used with our invention are: tributyl phosphine oxide, trioctyl phosphine oxide, tridecyl phosphine oxide, tridodecyl phosphine oxide, triphenyl phosphine oxide, tri-$\beta$ phenylethyl phosphine oxide, tris-($\gamma$-phenylpropyl) phosphine oxide, tritolyl phosphine oxide, tris-(dimethyl phenyl) phosphine oxide, and trinaphthyl phosphine oxide.

In using our invention, the uranium-bearing organic phase, which may be obtained by contacting an aqueous acidic solution containing uranium values with an organic solution of a trialkyl phosphine oxide in accordance with the method of the above-identified co-pending application of Willis H. Baldwin and Cecil E. Higgins is contacted with our aqueous complex-breaking stripping solution. Further, in accordance with our invention, when the acidic aqueous solution contains phosphate ions at a concentration greater than approximately 0.5 molar or sulfate ions at a concentration greater than approximately 0.5 molar and at a pH higher than 1, the uranium extraction coefficient may be materially increased if chloride ions or nitrate ions are incorporated in such solution prior to effecting the extraction. This increase is illustrated by the data of the following table:

TABLE I

*Effect of chloride and nitrate upon extractions from sulfate liquors*

Reagent: 0.1 M. tridecyl phosphine oxide in kerosene
Phase ratio=1:1
Sulfate conc.=50 g./liter
pH=0.8
U conc.: 1.2 g./liter
Fe conc.: 6.0 g./liter
Al conc.: 3.4 g./liter

| Anion | M | Extraction Coefficients | | |
|---|---|---|---|---|
| | | U | Fe | Al |
| 0 | 0 | 0.1 | | |
| Cl | 0.07 | 0.5 | 0.0015 | 0.015 |
| Cl | 0.14 | 1.1 | 0.003 | 0.010 |
| Cl | 0.28 | 2.8 | 0.002 | 0.008 |
| Cl | 0.42 | 5 | 0.008 | 0.007 |
| Cl | 0.56 | 15 | 0.015 | 0.015 |
| NO₃ | 0.08 | 25 | 0.002 | 0.004 |
| NO₃ | 0.16 | 75 | 0.002 | 0.01 |
| NO₃ | 0.24 | 125 | 0.003 | 0.004 |
| NO₃ | 0.32 | 200 | | |

In a similar test upon a uranium-bearing liquor at a phosphate concentration of 0.4 molar and a pH of 1, the extraction coefficient was increased from substantially less than 1 to approximately 24 by making the aqueous phase 0.3 molar in nitrate.

As can be seen from Table I, the extraction coefficient of the organic reagent for uranium in the presence of sulfate ion is increased by the addition of chloride or nitrate ions, and the selectivity of the reagent for uranium over common metal ion contaminants such as iron and aluminum values is not impaired and may be increased.

We have found that the addition of nitrate ion is more effective for these purposes than the addition of chloride ion. When the acidic aqueous solution contains phosphate ions or sulfate ions in a concentration greater than approximately 0.5 molar, if the solution is made approximately 0.3 molar in chloride ion or 0.05 molar in nitrate ion a practicable extraction process may be attained. If even greater uranium extraction coefficients are desired, the concentration of chloride ion or nitrate ion may be increased until the desired extraction coefficient is reached.

After the uranium values have been extracted into the organic phase by the trialkyl phosphine oxide the organic phase is then contacted with a stripping reagent. We have found aqueous alkaline solutions and acidic solutions of fluoride, phosphate and sulfate ions to be suitable complex-breaking stripping reagents.

Of the alkaline reagents, hydroxides and carbonates have been found to be suitable. The hydroxides break the organic-uranium complex and precipitate the uranium as the diuranate, while the carbonates break the organic-uranium complex and form the carbonate-uranium complex in the aqueous phase.

When a hydroxide is used to break the organic-uranium complex a suitable reagent is either an alkali or ammonium hydroxide. We have found a suitable concentration of sodium hydroxide to be from less than approximately 0.5 molar sodium hydroxide to over approximately 1.5 molar sodium hydroxide. We found that in stripping an organic phase containing 2600 mg. U/liter with 0.5 molar sodium hydroxide substantially complete precipitation of uranium was effected, approximately about 5 mg. U/liter remaining in the organic phase, while with 1.5 molar sodium hydroxide 130 mg. U/liter remained in the organic phase. Only about 50% of the uranium was removed with an aqueous solution containing 11.5 molar sodium hydroxide.

We have found that when ammonium hydroxide is used as the stripping reagent a suitable concentration is approximately 4 molar, approximately ninety percent of the uranium being removed at that concentration. The stripping efficiency decreases as the concentration of $NH_4OH$ is increased or decreased from approximately 4 molar. With 0.4 molar and with 12 molar $NH_4OH$ only approximately half of the uranium present in the organic phase was precipitated.

When the hydroxides are used as stripping agents the uranium precipitate formed may be removed from the liquid phases by conventional means such as centrifugation. The uranium precipitates formed by the addition of $NH_4OH$ were difficult to separate, but the precipitates formed by the addition of NaOH were easily centrifuged from the liquids. NaOH is the preferred hydroxide in view of the more efficient removal of uranium values effected by NaOH and the more desirable characteristics of the precipitate formed by NaOH as compared to $NH_4OH$.

We have found sodium and ammonium carbonates to be suitable carbonates for use as complex-breaking stripping reagents. Essentially complete stripping of uranium has been obtained in a single-stage strip at a range of concentration from 0.2 molar to 1.5 molar for sodium carbonate. Ammonium carbonate is less effective than sodium carbonate at equivalent concentrations, 67% being stripped by 0.2 molar ammonium carbonate as compared with 99.8% by 0.2 molar sodium carbonate from 0.1 molar trioctyl phosphine oxide in kerosene at a phase ratio of 1:1 and a two minute contact time. A suitable concentration range for sodium or ammonium carbonate is from below 0.2 molar to over 1.5 molar and the choice may be dictated by considerations other than stripping efficiency. One such consideration may be the amount of uranium desired in the aqueous phase.

The uranium concentration in the loaded strip solution is limited by stoichiometry to one-third the molarity of the sodium carbonate.

The uranium may be removed from the carbonate solution by well established procedures such as by destroying the carbonate complex by addition of an acid such as sulfuric acid and subsequent precipitation of the uranium as the diuranate by addition of sodium hydroxide.

Certain acidic solutions may be used to strip the uranium from the organic phase. Acidic solutions of fluoride, phospate and sulfate ions break the organic-uranium complex, with the fluoride, phosphate or sulfate ions forming a new uranium complex in the aqueous phase. Other mineral and organic acids such as hydrochloric, sulfuric, acetic and oxalic acids will not effectively strip uranium values.

The following table gives the stripping coefficients for several reagents including the acidic solutions of fluoride, phosphate and sulfate ions. The stripping coefficient is defined as the ratio of the concentration of uranium values in the aqueous phase to the concentration of uranium values in the organic phase at equilibrium, and is a measure of the ability of a reagent to remove uranium from the uranium-loaded organic phase.

TABLE II

Organic solvent: 0.1 M trioctyl phosphine oxide in kerosene
Contact time: 2 minutes
Phase ratio (aqueous/organic): 1:1

| Stripping Reagent | Stripping Coefficient | |
|---|---|---|
| | Sulfate-Nitrate Solution [2] | Nitrate Solution [3] |
| Water [1] | Substantially zero | 0.06 |
| 0.1 M HCl [1] | do | 0.02 |
| 0.5 M $SO_4$; pH equal 2 | 1.2 | 0.2 |
| 4 M $SO_4$; pH equal 2 | 7.3 | 3.5 |
| 4 M $H_3PO_4$ | >8 | 8.1 |
| 4 M HF | 24 | 19 |
| 1 M HF | 3.1 | 4.3 |
| 1 M oxalic acid | No data | 0.04 |
| 4 M acetic acid | 0.8 | 0.11 |

[1] Phase ratio (aqueous:organic)=2:1.
[2] Uranium concentration 5 g./liter—originally extracted from a solution containing 20 g. $NO_3$/liter and 50 g. $SO_4$/liter.
[3] Uranium concentration 2 g./liter originally prepared from a uranyl nitrate solution containing 20 g. $NO_3$/liter.

As can be seen from Table II, water alone is ineffective in removing uranium values from an organic solution of a uranium-trialkyl phosphine oxide complex, while acidic aqueous solutions of the fluoride, phosphate and sulfate ion are effective in stripping uranium values from organic solutions of such complexes.

If an acidic aqueous solution of sulfate ions is used as the stripping agent, the stripping efficiency increases as the concentration of sulfate ion is raised, and decreases as the acidity is increased. We have found a suitable range of sulfate concentrations to be from approximately 0.5 M at a pH of approximately 2 to a sulfate concentration of 4 molar at a pH of from approximately 0.33 to approximately 2.

If an acidic aqueous solution containing phosphate ions is used as the stripping agent the stripping coefficient increases as the phosphate concentration increases and decreases with an increase in acidity. We have found a suitable range of phosphate concentrations to be from approximately 1.4 molar at a pH of above approximately 1.0 approximately 5 molar at a pH of below approximately 0.5.

If an acidic aqueous solution of fluoride ions is used as the stripping agent, we have found that a solution at an HF concentration of at least 1 molar is suitable. The stripping coefficient increases with an increase in the HF concentration.

The uranium-bearing organic phase may be contacted with the stripping reagent in any suitable liquid-liquid contacting apparatus such as a mixer-settler or an extraction column.

We have found that any of the trialkyl phosphine oxides of the above-identified co-pending application of Willis H. Baldwin and Cecil E. Higgins may be used in our improved process. As disclosed in that application the phosphine oxide may be dissolved in an inert organic diluent. Suitable organic diluents include carbon tetrachloride and petroleum fractions such as kerosene.

The following example illustrates in detail our improved process for recovering uranium values from an acidic aqueous solution using a trialkyl phosphine oxide as an extractant.

EXAMPLE I

To 7000 liters of a leach liquor obtained by leaching a uranium-bearing ore with sulfuric acid and containing 1.27 g./liter of uranium, 5.8 g./liter of iron, 3.5 g./liter of aluminum, 50 g./liter of sulfate and 1.9 g./liter of phosphate is added 47.6 kilograms of $NaNO_3$, making the $NO_3$ concentration in the resulting solution 0.08 molar. The pH of the resulting leach liquor is 0.8. This solution is contacted with 1000 liters of 0.1 M tridecyl phosphine oxide in kerosene by passing the two solutions in counter-current flow through an extraction column. The organic phase which is removed contains 8855 grams of uranium, 100 grams of iron and 50 grams of aluminum. The organic phase is then contacted with 233 liters of a 0.5 molar sodium carbonate solution. The two phases are mixed for two minutes, the phases are allowed to separate, and the aqueous phase is removed from the organic phase. 12,000 grams of concentrated sulfuric acid is added to the aqueous phase to neutralize the sodium carbonate and 2000 grams of $NH_3$ is added to precipitate the uranium as the ammonium diuranate. The final precipitate contains 8837 grams of uranium.

In the above example the leach liquor contained a high concentration of sulfate ion, and in order to effect good extraction with the phosphine oxide the sodium nitrate was added. If sulfate or phosphate are not present in substantial concentrations it is not necessary to add sodium nitrate.

The above example is intended to be merely illustrative and our invention should be limited only as is indicated by the appended claims.

Having thus described our invention we claim the following:

1. In a process for recovering uranium values from an acidic aqueous solution containing said values together with ions selected from the group consisting of sulfate ions and phosphate ions, which comprises contacting said solution with an organic solution comprised of a substantially water-immiscible organic diluent and a member selected from the group having the formula

where R is selected from the group consisting of alkyl radicals, aryl radicals and aryl-substituted alkyl radicals, whereby uranium values are extracted into the organic phase, separating the resulting uranium-loaded organic phase from the remaining aqueous phase, and removing extracted uranium values from said separated organic phase, the improvement which comprises incorporating chloride ions in said acidic aqueous solution, said ions being present in said aqueous solution during at least a portion of the step of contacting said aqueous solution with said organic solution.

2. In a process for recovering uranium values from an acidic aqueous solution containing said values together with ions selected from the group consisting of sulfate ions and phosphate ions, which comprises contacting said solution with an organic solution comprised of a substantially water-immiscible organic diluent and a member selected from the group having the formula

where R is selected from the group consisting of alkyl radicals, aryl radicals and aryl-substituted alkyl radicals, whereby uranium values are extracted into the organic phase, separating the resulting uranium-loaded organic phase from the remaining aqueous phase, and removing extracted uranium values from said separated organic phase, the improvements which comprise incorporating chloride ions in said acidic aqueous solution, said ions being present in said aqueous solution during at least a portion of the step of contacting said aqueous solution with said organic solution, and removing the extracted uranium values from the organic phase by an aqueous complex-breaking solution.

References Cited in the file of this patent

UNITED STATES PATENTS

| | | |
|---|---|---|
| 2,743,157 | Hagemann et al. | Apr. 24, 1956 |
| 2,816,005 | Furman et al. | Dec. 10, 1957 |
| 2,839,357 | Clark et al. | June 17, 1958 |
| 2,864,668 | Baldwin et al. | Dec. 16, 1958 |

FOREIGN PATENTS

| | | |
|---|---|---|
| 749,762 | Great Britain | Apr. 6, 1954 |

OTHER REFERENCES

Bartlett: K–706, 28 pages, Feb. 27, 1951, declassified Oct. 17, 1955.

Ellis: DOW–81, pages 44–52, July 14, 1952, declassified Sept. 29, 1955.